United States Patent
Chen et al.

(10) Patent No.: US 12,533,637 B2
(45) Date of Patent: Jan. 27, 2026

(54) BIOCHAR-ANAEROBIC MEMBRANE BIOLOGICAL TREATMENT SYSTEM AND PROCESS

(71) Applicant: Xi'an University of Architecture and Technology, Xi'an (CN)

(72) Inventors: Rong Chen, Xi'an (CN); Zhen Lei, Xi'an (CN); Jiale Zheng, Xi'an (CN); Hong Luo, Xi'an (CN)

(73) Assignee: Xi'an University of Architecture and Technology, Xi'an (CN)

( * ) Notice: Subject to any disclaimer, the term of this patent is extended or adjusted under 35 U.S.C. 154(b) by 479 days.

(21) Appl. No.: 18/317,162

(22) Filed: May 15, 2023

(65) Prior Publication Data

US 2024/0216867 A1 Jul. 4, 2024

(30) Foreign Application Priority Data

Dec. 28, 2022 (CN) .......................... 202211699159.8

(51) Int. Cl.
*B01D 65/02* (2006.01)
*B01D 63/02* (2006.01)
(Continued)

(52) U.S. Cl.
CPC .............. *B01D 65/02* (2013.01); *B01D 63/02* (2013.01); *B01D 63/08* (2013.01); *B01D 65/08* (2013.01); *C02F 1/283* (2013.01); *C02F 3/006* (2013.01); *C02F 3/284* (2013.01); *C02F 3/2853* (2013.01); *C02F 3/2893* (2013.01);
(Continued)

(58) Field of Classification Search
CPC ........ B01D 63/02; B01D 63/08; B01D 65/02; B01D 65/08; B01D 2311/2688; B01D 2313/26; B01D 2313/40; B01D 2321/18; B01D 2321/185; B01D 2321/30; C02F 1/283; C02F 3/006; C02F 3/284; C02F 3/2853; C02F 3/2893; C02F 2101/30; C02F 2209/02; C02F 2209/03; C02F 2209/38; C02F 2209/40; C02F 2209/44; C02F 2303/20
See application file for complete search history.

(56) References Cited

U.S. PATENT DOCUMENTS

2012/0048801 A1* 3/2012 Hong .................... C02F 3/2853
                                                            210/603
2015/0144564 A1* 5/2015 Moller .................... C02F 1/283
                                                            210/201

* cited by examiner

*Primary Examiner* — Patrick Orme

(57) ABSTRACT

Provided is a biochar-anaerobic membrane biological treatment system and process. The system mainly includes a reaction tank, a membrane module, a macroporous gas distribution device, low-temperature pyrolysis biochar. The application of the process to sewage treatment shows that: under the conditions that the hydraulic retention time is 3.2-7.2 h, the membrane flux is 12.0-17.8 L/m$^2$/h, and the sludge concentration of 7.2-15.6 g/L, multiple objectives of promoting organic micropollutants (OMPs) biotransformation, accelerating methane production and strengthening membrane fouling control were achieved. The system improved OMPs removal efficiency by more than 20%, decreased membrane fouling rate by 50%, and reaching an organic matter removal efficiency of more than 86% at low temperature. The system and process solve the problems of poor OMPs removal efficiency, serious membrane fouling, and low methane yield at low temperature in the anaerobic membrane biological treatment system.

18 Claims, 8 Drawing Sheets

(51) Int. Cl.
    *B01D 63/08*     (2006.01)
    *B01D 65/08*     (2006.01)
    *C02F 1/28*     (2023.01)
    *C02F 3/00*     (2023.01)
    *C02F 3/28*     (2023.01)
    *C02F 101/30*     (2006.01)

(52) U.S. Cl.
    CPC ...... *B01D 2313/26* (2013.01); *B01D 2313/40* (2013.01); *B01D 2321/18* (2013.01); *B01D 2321/30* (2013.01); *C02F 2101/30* (2013.01); *C02F 2209/02* (2013.01); *C02F 2209/03* (2013.01); *C02F 2209/38* (2013.01); *C02F 2209/40* (2013.01); *C02F 2209/44* (2013.01); *C02F 2303/20* (2013.01)

BIOCHAR-ANAEROBIC MEMBRANE BIOLOGICAL TREATMENT SYSTEM AND PROCESS

CROSS-REFERENCE TO RELATED APPLICATION

This patent application claims the benefit and priority of Chinese Patent Application No. 202211699159.8, filed with the China National Intellectual Property Administration on Dec. 28, 2022, the disclosure of which is incorporated by reference herein in its entirety as part of the present application.

TECHNICAL FIELD

The present disclosure relates to the technical field of sewage treatment, and in particular to a biochar-anaerobic membrane biological treatment system and process.

BACKGROUND

Water scarcity and energy crisis have become a major challenge to human prosperity and development. The conventional technical concept of "improving water quality by increasing energy consumption" in aerobic sewage treatment results in high energy consumption and large carbon emissions in sewage treatment process, which is contrary to the concept of sustainable development advocated at present. Developing novel technologies that integrating the features of "pollutants removal, energy regeneration and resource recovery" has become a new trend in wastewater treatment. In this context, anaerobic biological treatment technology has received wide attention from workers in the field of wastewater treatment.

As sewage is rich in energy, the transformation of organic matters in the sewage into methane by the anaerobic biotechnology is important method to achieve energy neutral in sewage treatment. However, due to the limitation of slow proliferation rate of anaerobic microbes and large sludge loss, the conventional anaerobic treatment technology has a low energy recovery efficiency, which seriously restricts the application of anaerobic technology. In recent years, some researchers have proposed to combine anaerobic treatment technology with membrane separation technology, and thus an anaerobic membrane bioreactor (AnMBR) technology is developed. The AnMBR is configured to separate the solid retention time from hydraulic retention time through membrane interception, thus the long solid retention time and high organic load in the reactor can be maintained, the microbial biomass for methane production is increased, and the methane production can be improved.

Compared with the conventional anaerobic treatment technology, the AnMBR can significantly improve the organic matter removal efficiency and organic matter methanation, but the high sludge concentration in the long solid retention time may result in the aggravation of membrane fouling, the rapid increase of TMP (transmembrane pressure), the increase of operating energy consumption and the consumption of membrane fouling control reagents, which seriously restricts the large-scale application of AnMBR. In addition, due to the seasonal variation of wastewater temperature of the sewage, the activity of anaerobes is low at low temperature in winter, and even if the sludge concentration is kept high, the organic matter removal efficiency and methane production efficiency are still difficult to reach the expected value. More importantly, under the anaerobic conditions, due to low oxidation-reduction potential, poor microbial diversity, and slow biotransformation of various organic micropollutants (OMPs) contained in medicines and personal care products in sewage, the removal efficiency is significantly lower than that of aerobic treatment process. Such pollutants discharged into water may cause serious ecological and human health problems.

SUMMARY

An objective of the present disclosure is to provide a biochar-anaerobic membrane biological treatment system and process. The microbial activity at low temperature is enhanced, the pollutants removal efficiency is improved, the biotransformation of various OMPs is strengthened, and the OMPs removal efficiency is increased. In addition, the biochar also can effectively alleviate the membrane fouling problem.

To solve the technical problem above, the present disclosure employs the following technical solutions:

A biochar-anaerobic membrane biological treatment system and process are provided. The system includes a reaction tank, a membrane module arranged in the reaction tank, a gas distribution device located at the bottom of the reaction tank, a water inlet pump and pipe fittings for supplying water to the reaction tank, a water outlet pump for discharging water treated by the membrane module, and a biogas circulating pump for introducing biogas from the reaction tank into the gas distribution device.

A sludge discharge port is arranged at the bottom of the reaction tank.

A thermometer is arranged in the reaction tank. A pipeline between the water outlet pump and the membrane module is provided with a pressure transmitter, and the thermometer and the pressure transmitter are respectively connected to a control system.

Further, baffles are respectively arranged in the reaction tank and on both sides of the membrane module. The gas distribution device is arranged at the bottom of the membrane module.

Still further, a 10 mm-30 mm water flow channel is reserved between the bottom of the membrane module and the top of the gas distribution device to facilitate a sludge mixture and biochar to circulate along with the air flow, thus avoiding the blockage caused by the deposition of the biochar and achieving a better membrane fouling control effect.

Still further, macropores having a pore diameter of 1 mm to 2 mm are distributed on the gas distribution device.

Still further, the biochar is granular light biochar prepared using light raw materials, which is suspended in the reaction tank after absorbing water and flows circularly with the sludge in the reaction tank; and the amount of the biochar added to the reaction tank is 2.0 g/L to 5.0 g/L.

Still further, the biogas generated in the reaction tank passes through a pipeline and then is collected and treated after being dried by a water seal device. A gas flowmeter is arranged on the biogas conveying pipeline, and the gas flowmeter is connected to a control system.

Still further, a conveying pipeline of the water inlet pump is provided with a liquid flowmeter, and a thermometer socket for installing the thermometer is arranged on a side wall of the reaction tank.

Still further, the membrane module is made of a flat membrane or a curtain hollow fiber membrane to enable the biochar in fully contact with the membrane surface, thus achieving a better membrane fouling control effect.

Still further, the hydraulic retention time in the reaction tank should be controlled at 3.2 h to 7.2 h, and the membrane flux is 12.0 L/m²/h to 17.8 L/m²/h.

It is provided a biochar-anaerobic membrane biological treatment process according to an embodiment.

The light biochar prepared by low-temperature pyrolysis of corncobs is added in a reaction tank. During the operation of a reactor, on the one hand, the surface of the biochar prepared by low-temperature pyrolysis contains quinone organic functional groups, which can improve the electron transfer efficiency among different functional microbes in the process of methane production, and strengthen methane production from the anaerobic intermediate metabolites propionic acid and acetic acids. On the other hand, the biochar has good adsorption characteristics for OMPs, which forms a local OMPs high-concentration area on the surface of the biochar to enrich specific microbes capable of degrading the OMPs and strengthen the biotransformation of the OMPs. Base on above process, good pollutants removal and efficient methane production are achieved in the reaction tank. In the above treatment process, the biogas is used to scour the membrane surface with an intensity of 1.75 m³/m²/h to 2.7 m³/m²/h to control membrane fouling, and the treated water obtained by membrane separation of the sludge mixture under the action of the water outlet pump is discharged along a water outlet pipeline. In the process of circularly scouring the membrane surface by the biogas, the sludge mixture and the biochar circulate together with the air flow; and the granular biochar strengthens the scouring strength of the air flow on the membrane surface, and inhibits the adhesion-deposition of sludge flocs on the membrane surface, thus effectively alleviating the membrane fouling.

Compared with the prior art, the present disclosure has the beneficial effects as follows:

In accordance with the present disclosure, the corncobs are used as raw materials to prepare biochar at a low temperature, and the biochar is configured for sewage and wastewater treatment, which practices the concept of waste resource utilization and achieves good treatment effect. Under the condition of low input, the process achieves the enhancement of anaerobic methane production, the improvement of OMPs treatment efficiency and the alleviation of membrane fouling, and solves the problems that various methods for enhancing OMPs removal, improving methane production and controlling membrane fouling in current research are independent of one another and difficult to be compatible. A novel multifunctional anaerobic membrane treatment system and process provided by the present disclosure have a broad application prospect.

BRIEF DESCRIPTION OF THE DRAWINGS

The present disclosure is further described in detail below with reference to the accompanying drawings.

DETAILED DESCRIPTION OF THE EMBODIMENTS

Figure 1A:
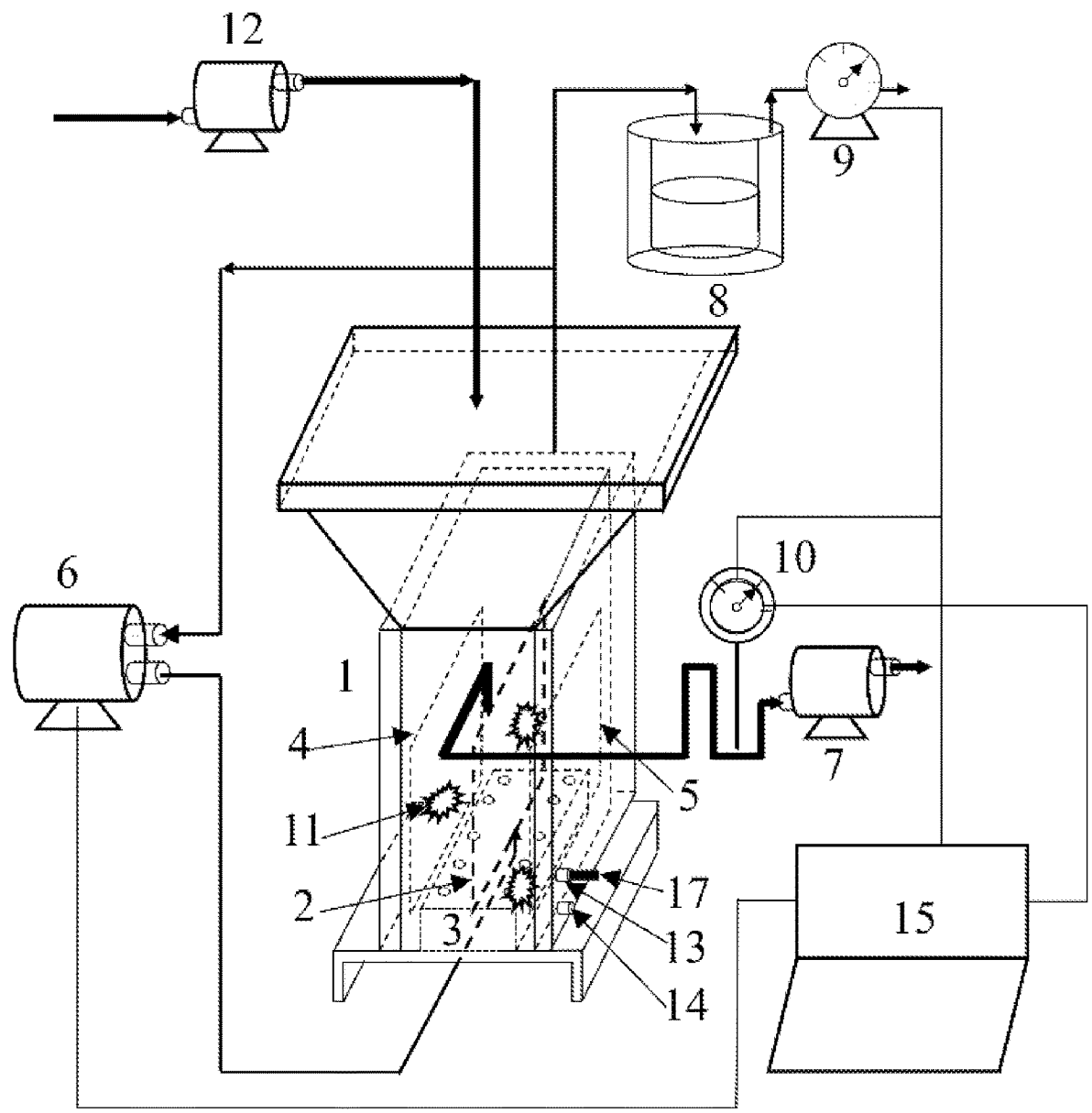
FIG. 1A is a biochar-anaerobic membrane biological treatment system in accordance with the present disclosure.

It is provided a biochar-anaerobic membrane biological treatment system in accordance with an embodiment. The system includes a reaction tank 1, a membrane module 2 arranged in the reaction tank 1, a gas distribution device 3 located at the bottom of the reaction tank 1, a water inlet pump 12 and pipe fittings for supplying water to the reaction tank 1, a water outlet pump 7 for discharging water treated by the membrane module 2, and a biogas circulating pump 6 for introducing biogas from the reaction tank 1 into the gas distribution device 3.

A sludge discharge port 14 is arranged at the bottom of the reaction tank 1.

A thermometer 17 is also arranged in the reaction tank 1. A pipeline between the water outlet pump 7 and the membrane module 2 is provided with a pressure transmitter 10, and the thermometer 17 and the pressure transmitter 10 are respectively connected to a control system 15.

In this embodiment, baffles 4, 5 are respectively arranged in the reaction tank 1 and on both sides of the membrane module 2. The gas distribution device 3 is arranged at the bottom of the membrane module 2.

In this embodiment, a 10 mm-30 mm water flow channel is reserved between the bottom of the membrane module 2 and the top of the gas distribution device 3 to facilitate a sludge mixture and the biochar 11 to circulate along with the air flow, thus avoiding the blockage caused by the deposition of the biochar 11 and achieving a better membrane fouling control effect.

In this embodiment, macropores having a pore diameter of 1 mm to 2 mm are distributed on the gas distribution device 3. Biogas may generate large bubbles through the gas distribution device, and thus the membrane fouling control effect is better than that of microporous aeration.

The biochar 11 is granular light biochar (at a density of 0.65 t/m³ and having a diameter of 2 to 3 mm) prepared using light raw materials (corncob particles), which is suspended in the reaction tank 1 after absorbing water and flows circularly with the sludge in the reaction tank.

In this embodiment, the biogas generated in the reaction tank 1 passes through a pipeline and then is collected and treated after being dried by a water seal device 8. A gas flowmeter 9 is arranged on the biogas conveying pipeline, and the gas flowmeter 9 is connected to the control system 15.

In this embodiment, a conveying pipeline of the water inlet pump 12 is provided with a liquid flowmeter, and a thermometer socket 13 for installing the thermometer 17 is arranged on a side wall of the reaction tank 1.

In this embodiment, the membrane module 2 may be made of a flat membrane or a curtain hollow fiber membrane (having a membrane pore size of 0.1 to 0.2 μm), which makes the biochar 11 in full contact with the membrane surface, thus achieving a better membrane fouling control effect.

In this embodiment, the hydraulic retention time in the reaction tank 1 should be controlled at 3.2 h to 7.2 h, and the membrane flux is 12.0 L/m²/h to 17.8 L/m²/h.

Embodiment 1

The application of the system and process disclosed by the present disclosure to the sewage treatment at low temperature obtains a good effect. When the temperature decreases to 10 centigrade from 18 centigrade, propionic acid and acetic acid accumulation occurs in an AnMBR, the COD (Chemical oxygen demand) concentration of the effluent is increased, and the methane production efficiency is reduced. Meanwhile, as the low temperature leads to the aggravation of membrane fouling, the AnMBR is hard to operate continuously and stably. The treatment efficiency of the AnMBR is improved by using the system and process provided by the present disclosure, with the specific steps as follows.

The preparation of light biochar is as follows: employing a tubular atmosphere furnace, using nitrogen as protective gas, and taking 3 mm-5 mm dried corncob particles as raw materials, setting the temperature rise condition at 15 centigrade/min, keeping the temperature constant for 90 min after the temperature rises to 500 centigrade, and then naturally cooling to obtain the light biochar prepared by low-temperature pyrolysis.

Figure 1B:
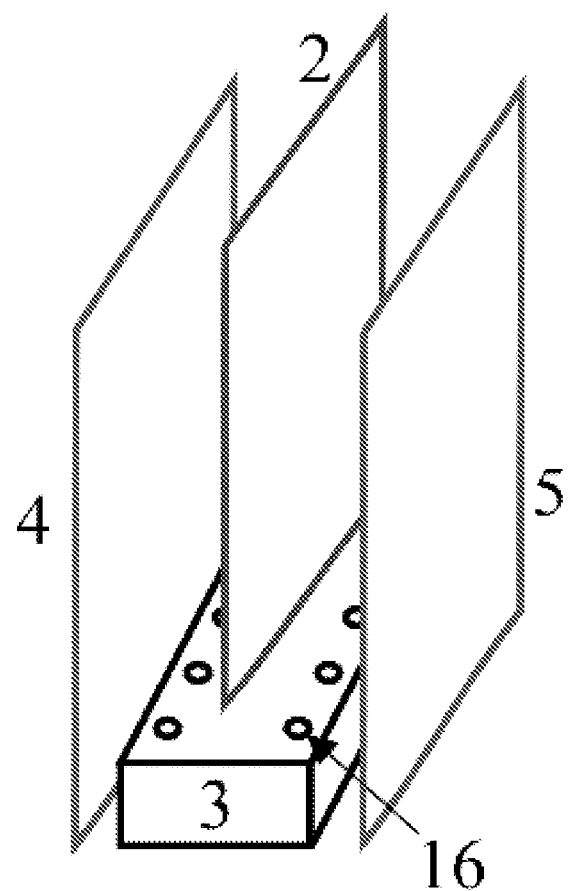
FIG. 1B shows components of a gas distribution device and baffles.
Figure 1C:
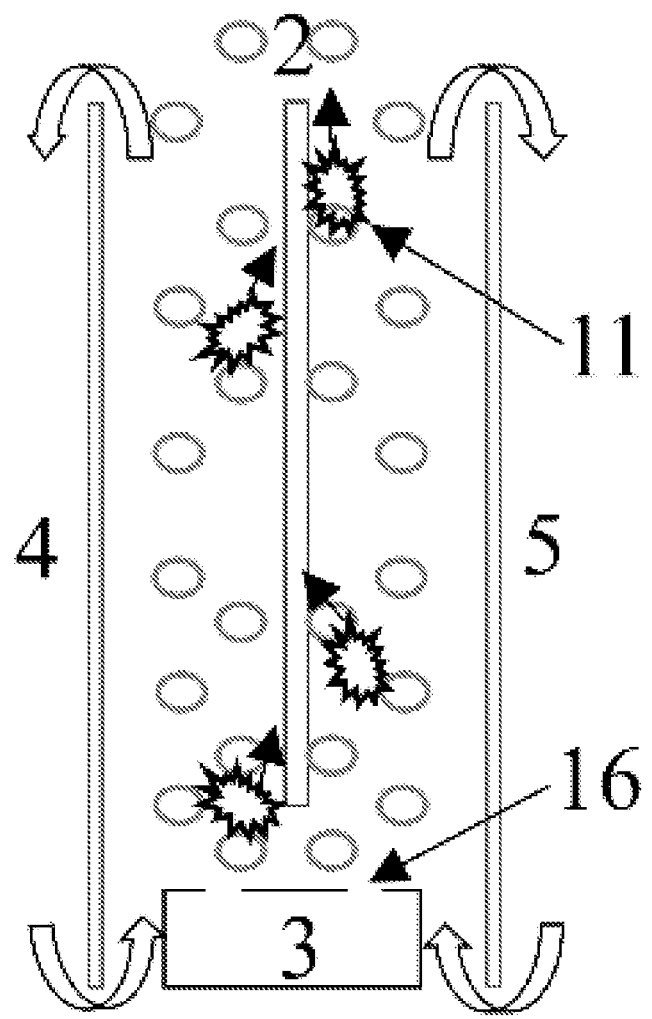
FIG. 1C shows components of a gas distribution device and baffles.

The AnMBR system shown in FIG. 1A-C is used for municipal wastewater treatment, an initial temperature is set to be 18 centigrade; the AnMBR system is operated for a period of time until TMP reaches 30 kPa, 2.0 g/L of biochar is added in the reaction tank while replacing the membrane with a new membrane. Afterwards, the AnMBR is operated for the same time as before, and the membrane is replaced and the biochar in the sludge is filtered.

The operation temperature of the AnMBR is stepped down from 18 centigrade to 10 centigrade, the AnMBR is operated at 10 centigrade until TMP reaches 30 kPa, then the membrane is replaced with a new membrane, and the AnMBR is re-operated until TMP reaches 30 kPa. Afterwards, the membrane is replaced with a new membrane again and 2.0 g/L of biochar is added to the AnMBR, and the AnMBR is re-operated until TMP reaches 30 kPa.

The biogas yield, the methane content in the biogas, the COD concentration in influent and effluent, the volatile fatty acid concentration in the effluent and the TMP are monitored during the operation of the AnMBR.

Figure 2A:
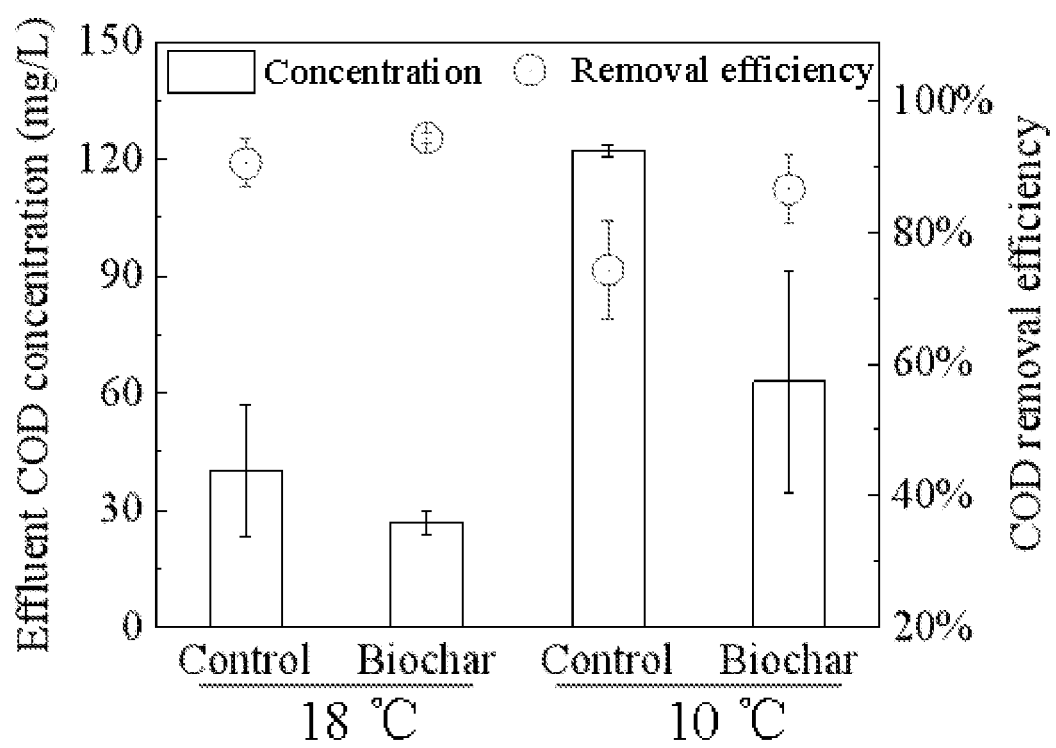
FIG. 2A shows effect diagrams of biochar improved pollutants removal and methane production efficiency in AnMBR at a low temperature in accordance with the present disclosure.
Figure 2B:
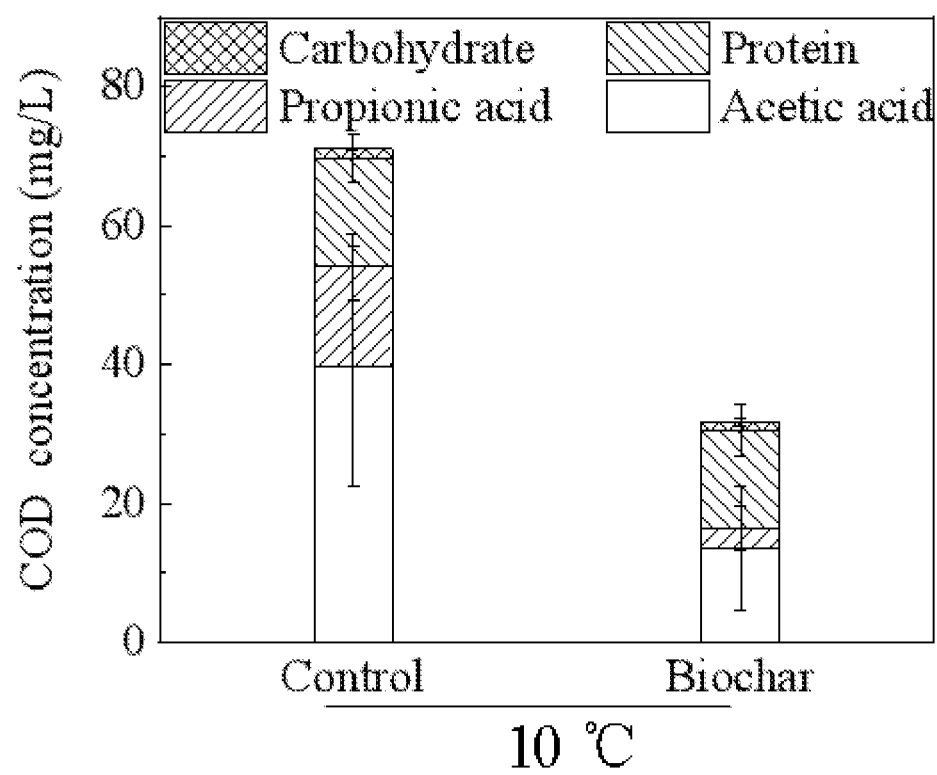
FIG. 2B shows effect diagrams of biochar improved pollutants removal and methane production efficiency in AnMBR at a low temperature in accordance with the present disclosure.
Figure 2C:
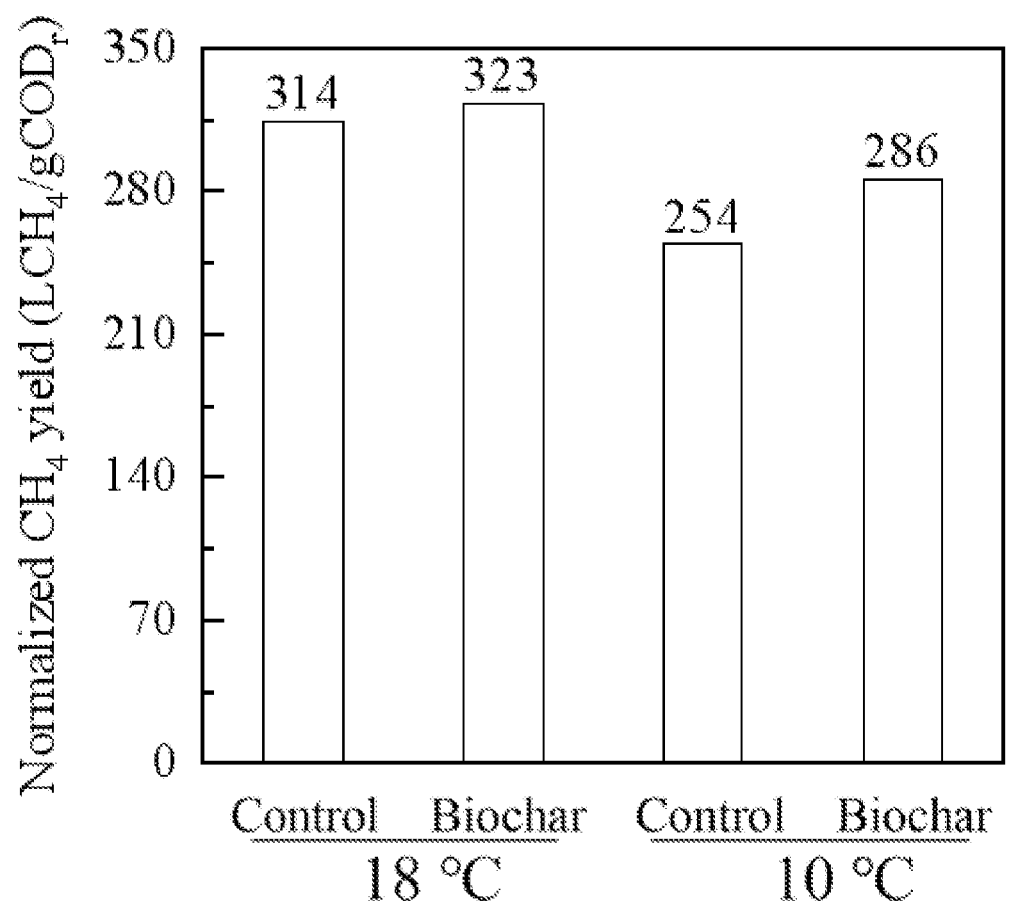
FIG. 2C shows effect diagrams of biochar improved pollutants removal and methane production efficiency in AnMBR at a low temperature in accordance with the present disclosure.

It can be seen from FIG. 2A-C that after the biochar is added at 10 centigrade, the COD concentration and volatile fatty acid concentration in the effluent are significantly decreased, and the COD removable efficiency and the methane yield are significantly increased.

Figure 3:
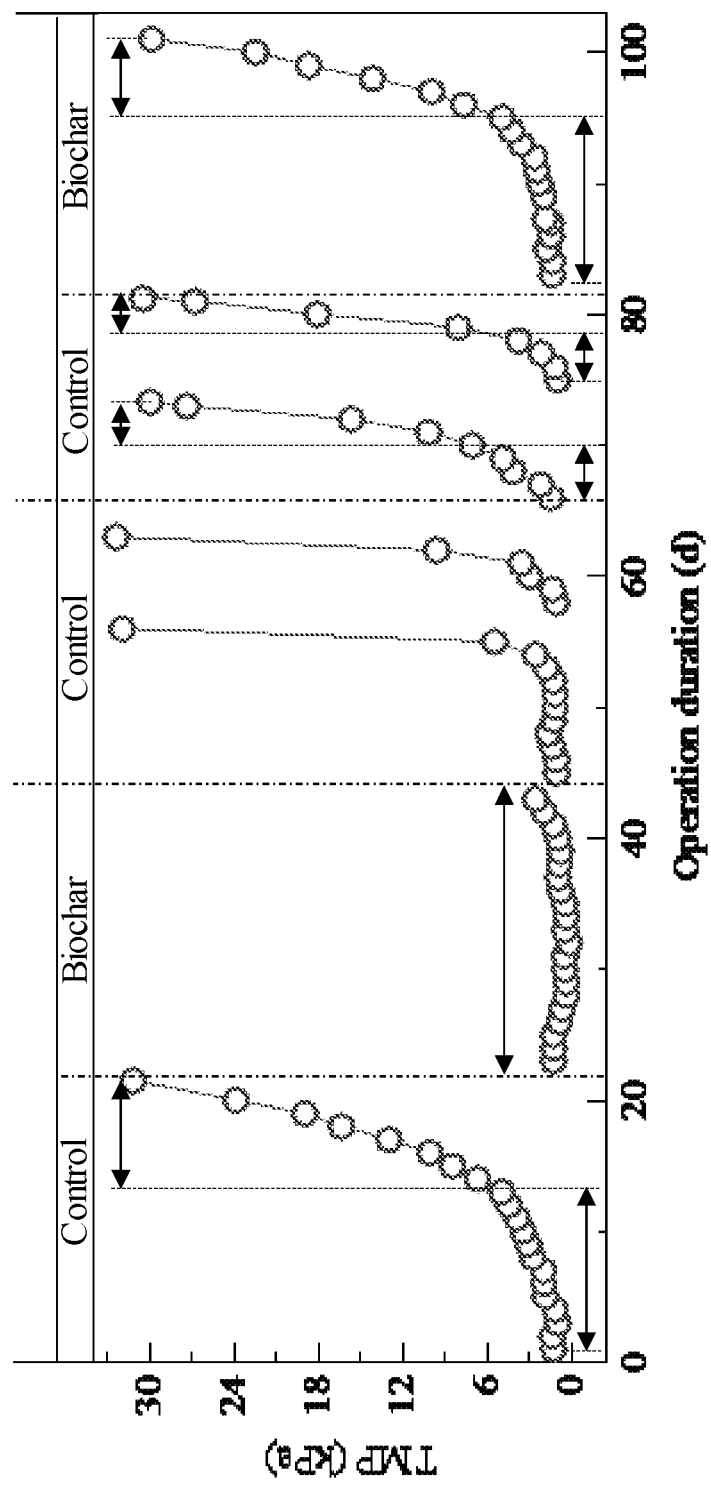
FIG. 3 is an effect diagram of biochar strengthened membrane fouling control in AnMBR in accordance with the present disclosure.

It can be seen from FIG. 3 that whether at 18 centigrade or 10 centigrade, the increase rate of TMP is reduced significantly (more than 50%) after the biochar is added, and the membrane fouling control effect is remarkable.

Embodiment 2

The present disclosure is used for enhancing the OMPs removal efficiency in the sewage treated by an anaerobic membrane system. When the municipal wastewater is treated at 25 centigrade, the AnMBR has a low removal efficiency of 76.5% for twenty-two OMPs and a removal efficiency of less than 50% for many OMPs. Specific steps of improving the OMPs removal efficiency by using the present disclosure are as follows:

An AnMBR system shown in FIG. 1A-C are used for sewage treatment, twenty-two OMPs with the concentration of 2.0 μg/L are added into the sewage, the operation temperature is set to be 25 centigrade, and the HRT is set to be 3.2 h to 5.5 h. After the system is operated stably for a period of time, the OMPs concentrations in the influent and effluent are measured every three days, for a total of ten times. In addition, the OMPs concentration adsorbed by the sludge in the reaction tank is determined while carrying out the first and the tenth sample determination.

After the above operation is finished, the membrane is replaced with a new membrane, and 5.0 g/L of the biochar which is the same as that in the embodiment 1 is added into the reaction tank. The reactor continues to operate, and the OMPs concentrations in the influent and the effluent are determined every three days, for a total of ten times. In addition, the OMPs concentration adsorbed by the sludge in the reaction tank is determined while carrying out the first and the tenth sample determination.

Figure 4:
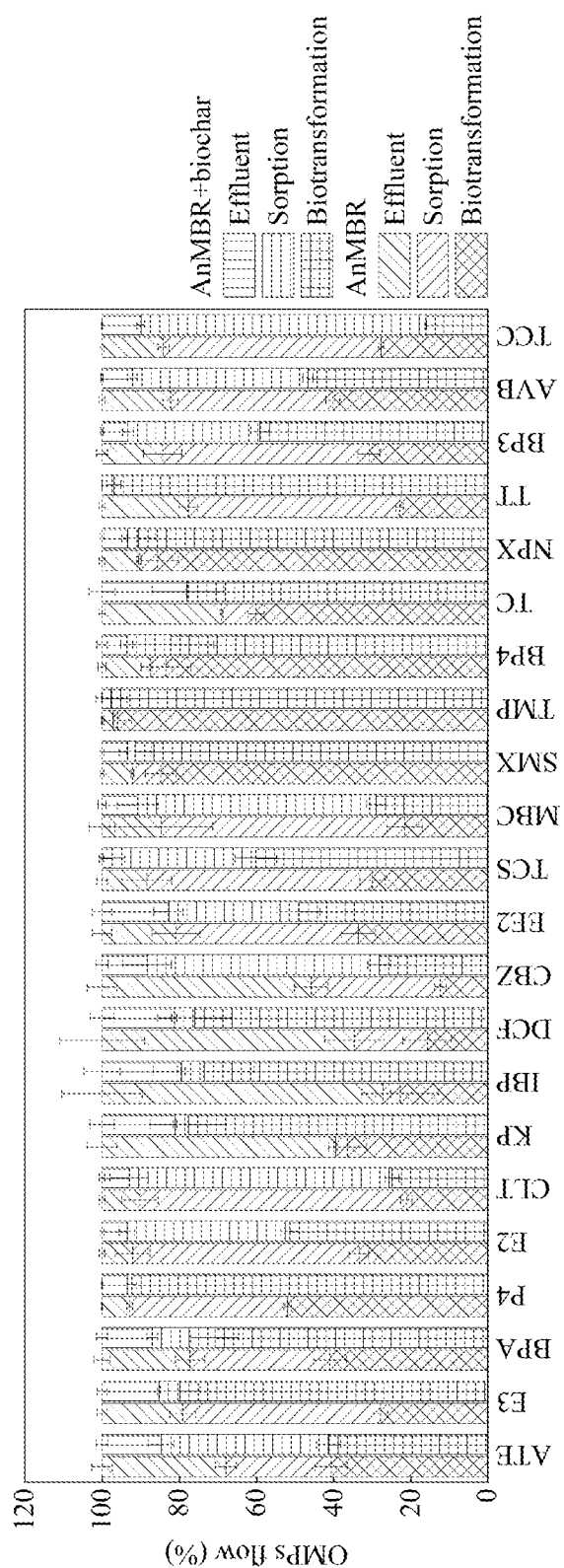
FIG. 4 is an effect diagram of biochar improved OMPs degradation in AnMBR in accordance with the present disclosure.

It can be seen from FIG. 4 that before the biochar is added, the AnMBR has a removal efficiency of 76.8% for twenty-two OMPs, and has a removal efficiency of less than 40% for four OMPs such as Ketoprofen, Ibuprofen, Musk Salix and Carbamazepine. After the biochar is added, the average removal efficiency of twenty-two OMPs reaches 88.7%, and the removal efficiency of all OMPs exceeds 80%. After the biochar is added, the proportion of biotransformation in fifteen OMPs removal paths increase significantly, and the adsorption removal contribution of only four OMPs increase, indicating that the biochar mainly strengthens the removal effect by enhancing the biotransformation of OMPs.

Note: (ATE: atenolol; AVB: avobenzone; BPA: bisphenol A; CBZ: carbamazepine; CLT: celestolide; DCF: diclofenac; E3: estriol; E2: 17β-estradiol; EE2: 17α-ethinylestradiol; IBP: Ibuprofen; KP: ketoprofen; MBC: 3-(4-methylbenzyliden) camphor; NPX: naproxen; BP3: oxybenzone; P4: progesterone; BP4: spectra-sorb UV 284; SMX: sulfamethoxazole; TC: tetracycline; TCC: triclocarban; TCS: triclosan; TMP: trimethoprim; TT: testosterone)

In the description of the present disclosure, it should be understood that the orientation or positional relationship indicated by terms "longitudinal", "transverse", "upper", "lower", "front", "back", "left", "right", "vertical", "horizontal", "top", "bottom", "inside", "outside" is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure.

The above embodiments are merely a description of the preferred mode of the present disclosure, but do not limit the scope of the present disclosure. Without departing from the spirit of the design of the present disclosure, all deformations and improvements made to the technical solutions of the present disclosure by those of ordinary skill in the art shall fall within the scope of protection appended by the claims of the present disclosure.

What is claimed is:

1. A biochar-anaerobic membrane biological treatment system, comprising a reaction tank (1), a membrane module (2) installed in the reaction tank (1), a gas distribution device (3) located at the bottom of the reaction tank (1), a water inlet pump (12) and pipe fittings for supplying water to the reaction tank (1), a water outlet pump (7) for discharging water treated by the membrane module (2), and a biogas circulating pump (6) for introducing biogas from the reaction tank (1) into the gas distribution device (3);
a sludge discharge port (14) is arranged at the bottom of the reaction tank (1);
a thermometer (17) is arranged in the reaction tank (1); a pipeline between the water outlet pump (7) and the membrane module (2) is provided with a pressure transmitter (10), and the thermometer (17) and the pressure transmitter (10) are respectively connected to a control system (15).

2. The biochar-anaerobic membrane biological treatment system according to claim 1, wherein baffles (4, 5) are respectively arranged in the reaction tank (1) and on both sides of the membrane module (2), and the gas distribution device (3) is set below the membrane module (2).

3. The biochar-anaerobic membrane biological treatment system according to claim 2, wherein a 10 mm-30 mm water flow channel is reserved between the bottom of the membrane module (2) and the top of the gas distribution device (3) to facilitate a sludge mixture and biochar to circulate along with the air flow, thus avoiding the blockage caused by the deposition of the biochar (11) and achieving a better membrane fouling control effect.

4. The biochar-anaerobic membrane biological treatment system according to claim 3, wherein the biochar (11) is granular light biochar prepared using light raw materials, which is suspended in the reaction tank (1) after absorbing water and flows circularly with the sludge in the reaction tank; and the amount of the biochar (11) added to the reaction tank is 2.0 g/L to 5.0 g/L.

5. The biochar-anaerobic membrane biological treatment system according to claim 2, wherein macropores having a pore diameter of 1 mm to 2 mm are distributed on the gas distribution device (3).

6. The biochar-anaerobic membrane biological treatment system according to claim 1, wherein biogas generated in the reaction tank (1) passes through a pipeline and then is collected and treated after being dried by a water seal device (8); a gas flowmeter (9) is installed on the biogas conveying pipeline, and the gas flowmeter (9) is connected to a control system (15).

7. The biochar-anaerobic membrane biological treatment system according to claim 1, wherein a conveying pipeline of the water inlet pump (12) is provided with a liquid flowmeter, and a thermometer socket (13) for installing the thermometer (17) is arranged on a side wall of the reaction tank (1).

8. The biochar-anaerobic membrane biological treatment system according to claim 1, wherein the membrane module (2) is made of a flat membrane or a curtain hollow fiber membrane to enable the biochar (11) in sufficient contact with the membrane surface, thus achieving a better membrane fouling control effect.

9. The biochar-anaerobic membrane biological treatment system according to claim 1, wherein the hydraulic retention time in the reaction tank (1) is to be controlled at 3.2 h to 7.2 h, and the membrane flux is 12.0 L/m$^2$/h to 17.8 L/m$^2$/h.

10. A biochar-anaerobic membrane biological treatment process based on the biochar-anaerobic membrane biological treatment system according to claim 1, comprising the following steps:
adding light biochar prepared by low-temperature pyrolysis of corncobs in a reaction tank (1); wherein during the operation of a reactor, on the one hand, the surface of the biochar prepared by low-temperature pyrolysis contains quinone organic functional groups, which are able to improve the electron transfer efficiency among different functional microbes in the process of methane production, and strengthen the anaerobic intermediate metabolites propionic acid and methane produced from acetic acid; on the other hand, the biochar has good adsorption characteristics for OMPs, which forms a local OMPs high-concentration area on the surface of the biochar to enrich specific microbial populations capable of degrading OMPs and strengthen the biotransformation of the OMPs; base on above process, good pollutants removal and efficient methane production is achieved in the reaction tank;
in above treatment process, scouring the membrane surface by the biogas with an intensity of 1.75 m$^3$/m$^2$/h to 2.7 m$^3$/m$^2$/h to control membrane fouling, and discharging treated water obtained by membrane separation of the sludge mixture under the action of the water outlet pump is discharged along a water outlet pipeline, wherein in the process of circularly scouring the membrane surface by the biogas, the sludge mixture and the biochar circulate together with the air flow; the granular biochar strengthens the scouring strength of the air flow on the membrane surface, and inhibits the adhesion-deposition of sludge flocs on the membrane surface, thus effectively alleviating the membrane fouling.

11. The biochar-anaerobic membrane biological treatment process according to claim 10, wherein baffles are respectively arranged in the reaction tank (1) and on both sides of the membrane module (2), and the gas distribution device (3) is set below the membrane module (2).

12. The biochar-anaerobic membrane biological treatment process according to claim 11, wherein a 10 mm-30 mm water flow channel is reserved between the bottom of the membrane module (2) and the top of the gas distribution device (3) to facilitate a sludge mixture and biochar to circulate along with the air flow, thus avoiding the blockage caused by the deposition of the biochar (11) and achieving a better membrane fouling control effect.

13. The biochar-anaerobic membrane biological treatment process according to claim 12, wherein the biochar (11) is granular biochar prepared using light raw materials, which is suspended in the reaction tank (1) after absorbing water and flows circularly with the sludge in the reaction tank; and the amount of the biochar (11) added to the reaction tank is 2.0 g/L to 5.0 g/L.

14. The biochar-anaerobic membrane biological treatment process according to claim 11, wherein macropores having a pore diameter of 1 mm to 2 mm are distributed on the gas distribution device (3).

15. The biochar-anaerobic membrane biological treatment process according to claim 10, wherein biogas generated in the reaction tank (1) passes through a pipeline and then is collected and treated after being dried by a water seal device (8); a gas flowmeter (9) is installed on the biogas conveying pipeline, and the gas flowmeter (9) is connected to a control system (15).

16. The biochar-anaerobic membrane biological treatment process according to claim 10, wherein a conveying pipeline of the water inlet pump (12) is provided with a liquid flowmeter, and a thermometer socket (13) for installing the thermometer (17) is arranged on a side wall of the reaction tank (1).

17. The biochar-anaerobic membrane biological treatment process according to claim 10, wherein the membrane module (2) is made of a flat membrane or a curtain hollow fiber membrane to enable the biochar (11) in sufficient contact with the membrane surface, thus achieving a better membrane fouling control effect.

18. The biochar-anaerobic membrane biological treatment process according to claim 10, wherein the hydraulic retention time in the reaction tank (1) is to be controlled at 3.2 h to 7.2 h, and the membrane flux is 12.0 $L/m^2/h$ to 17.8 $L/m^2/h$.

\* \* \* \* \*